March 5, 1940.   R. L. COOPER   2,192,673
ILLUMINATION CONTROL SYSTEM
Filed Oct. 5, 1937   7 Sheets-Sheet 1
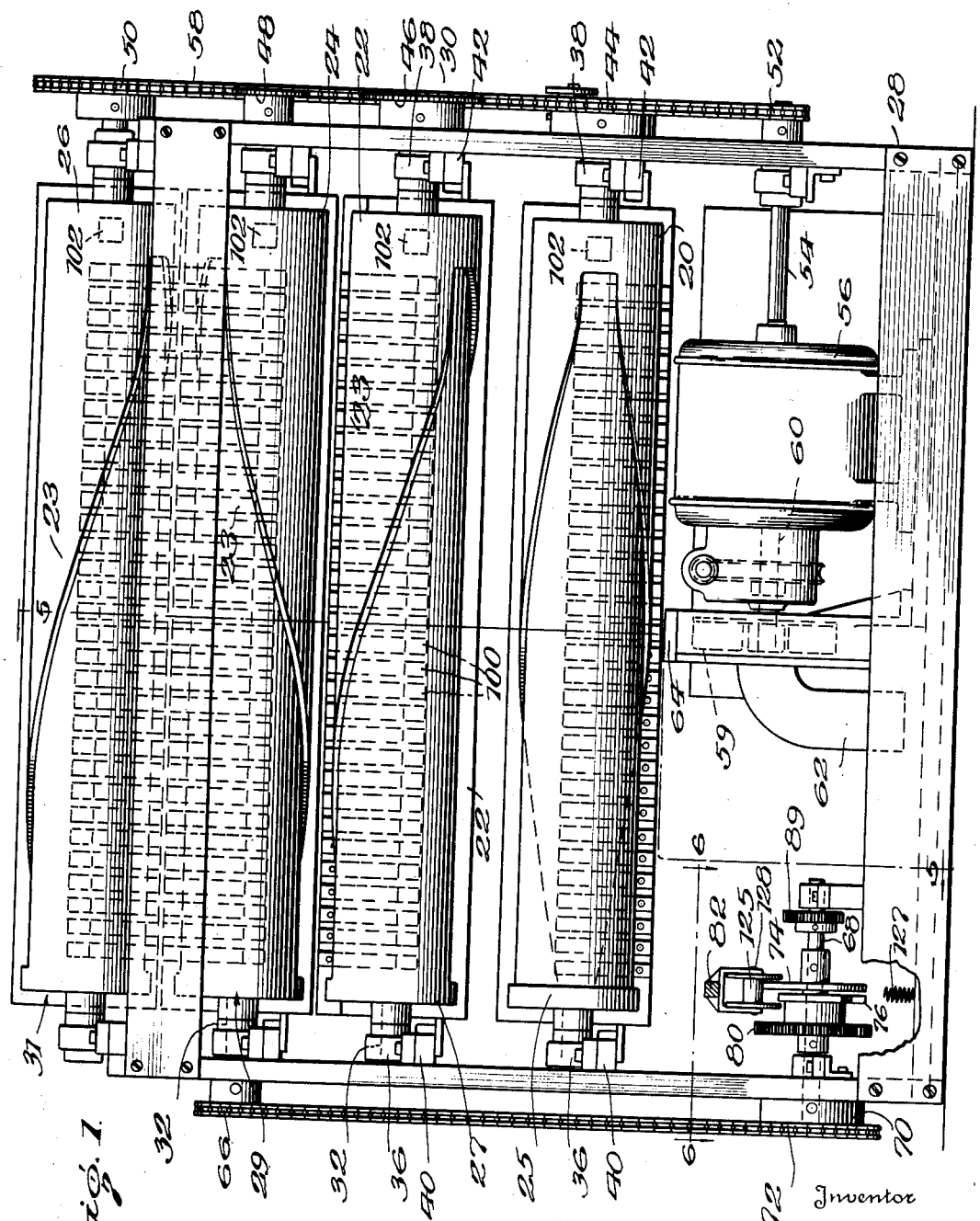
Inventor
Roy L. Cooper,
By John L. Woodward
Attorney

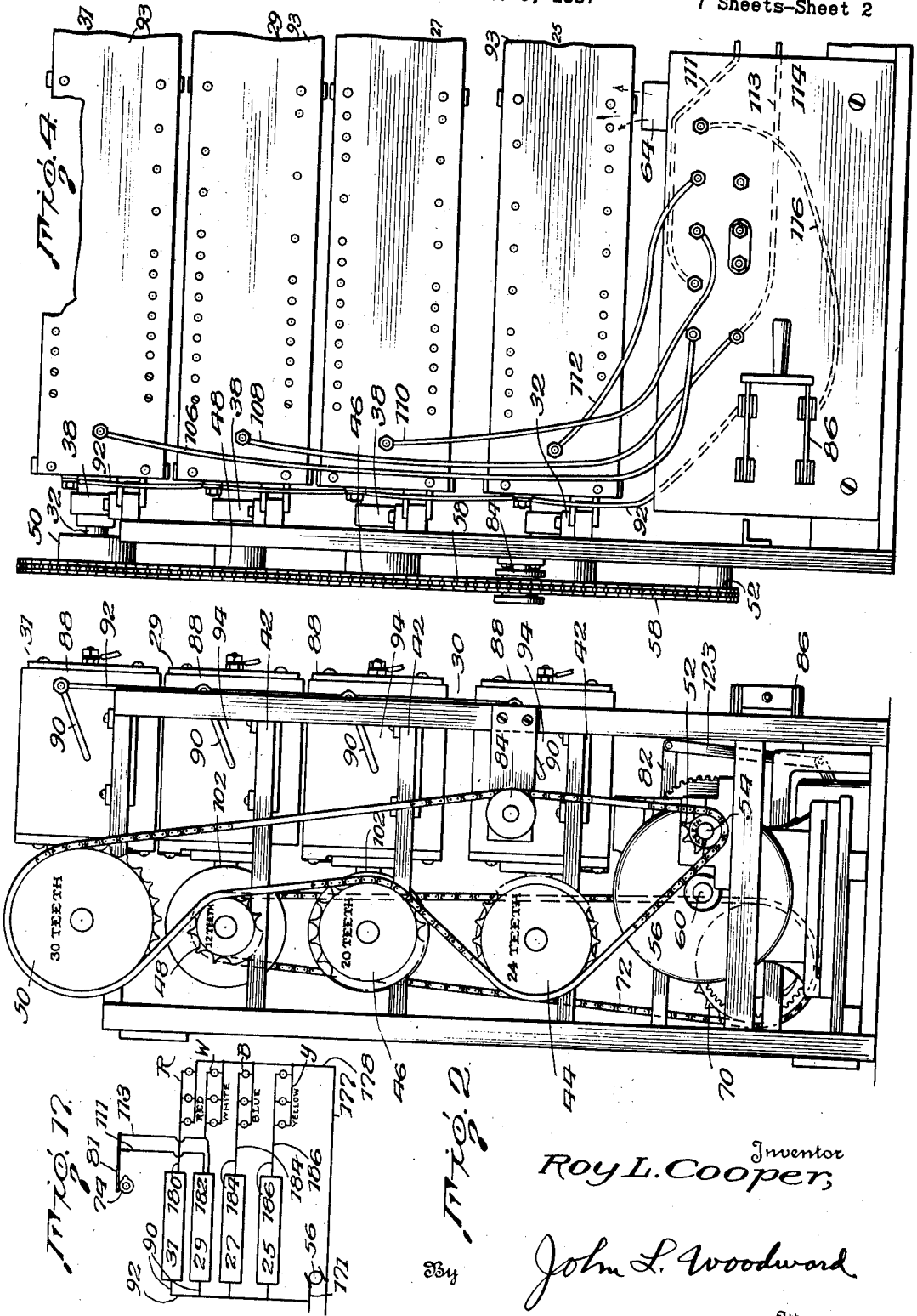

March 5, 1940.   R. L. COOPER   2,192,673
ILLUMINATION CONTROL SYSTEM
Filed Oct. 5, 1937   7 Sheets-Sheet 3
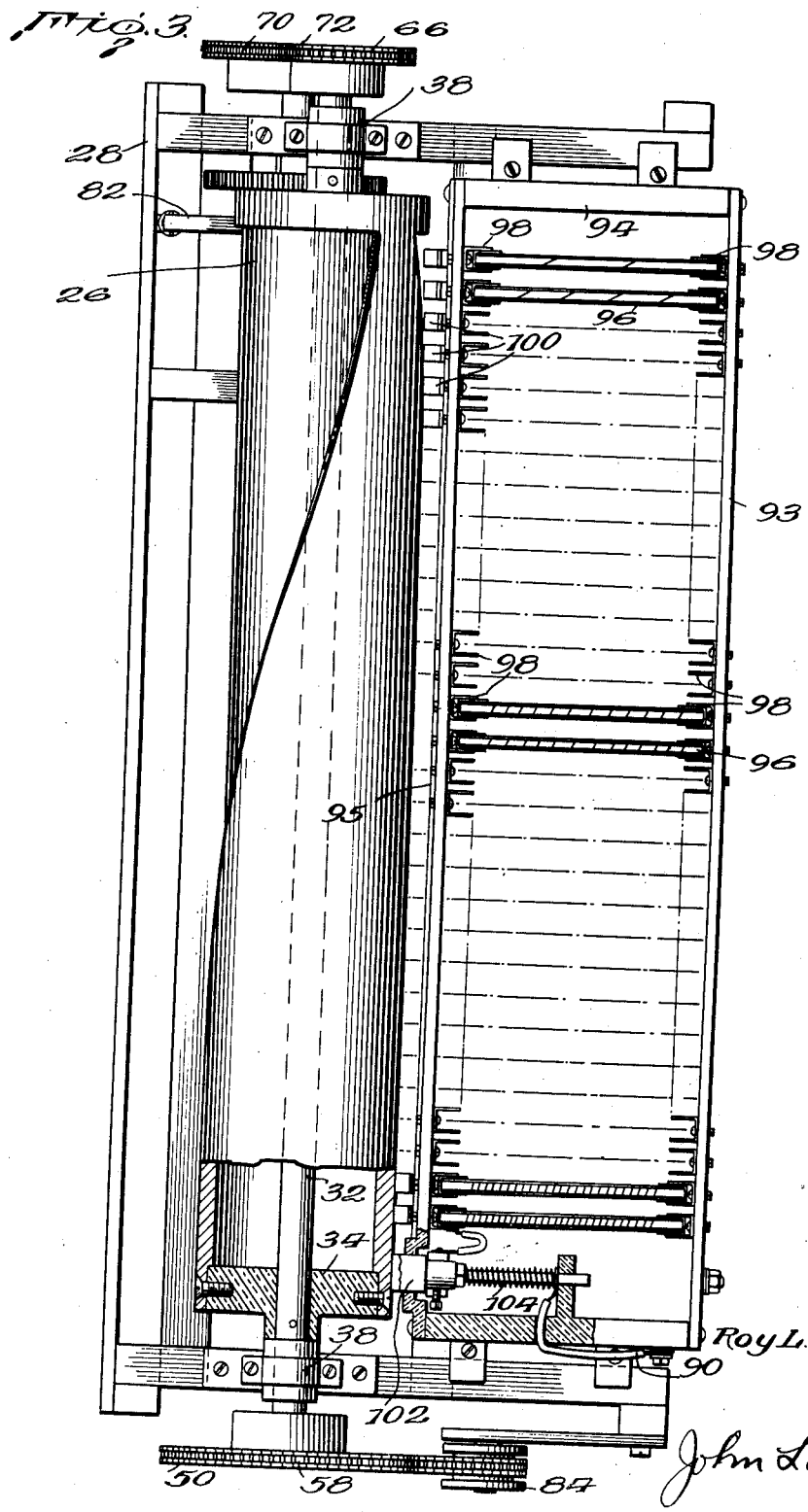

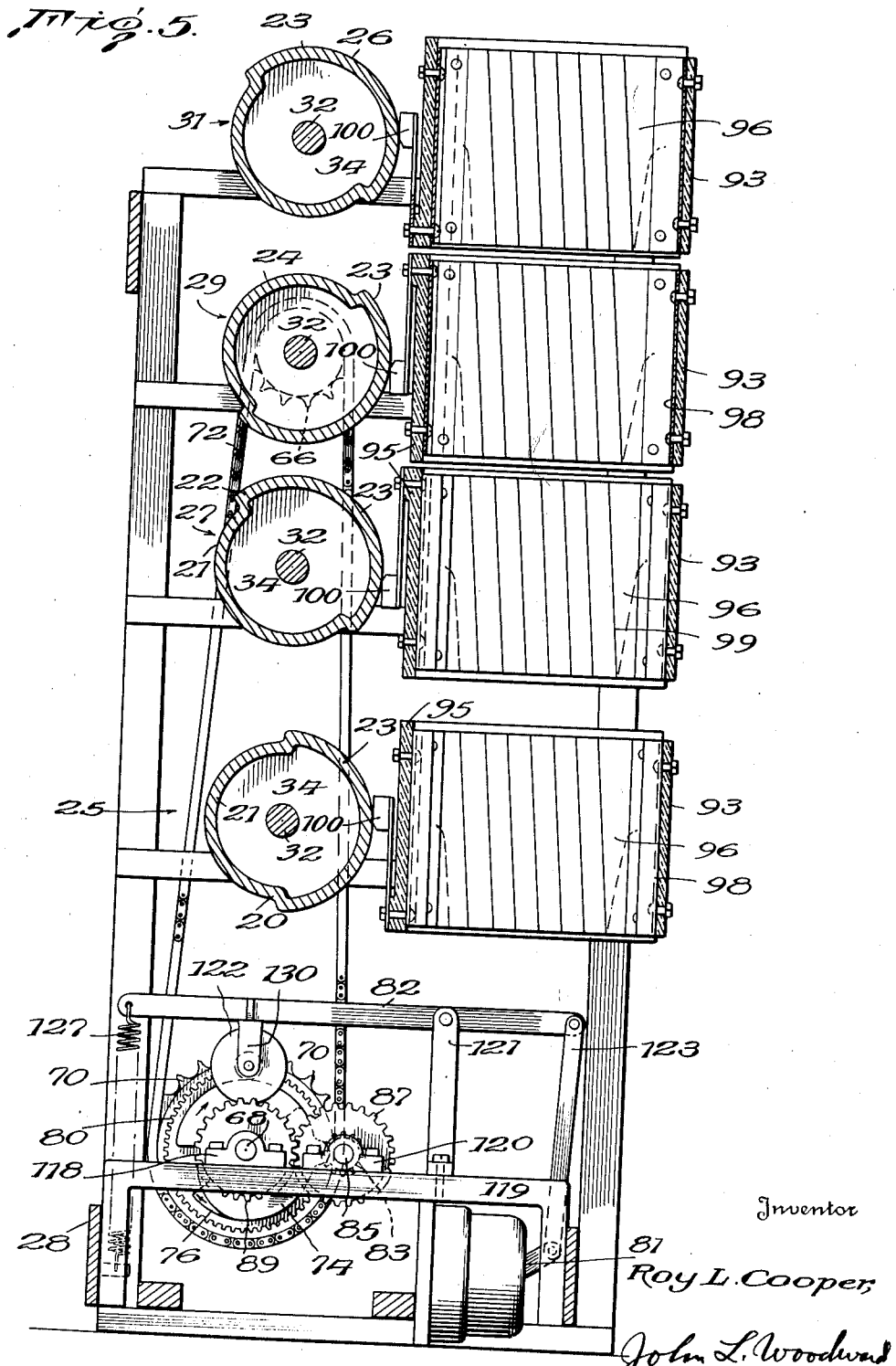

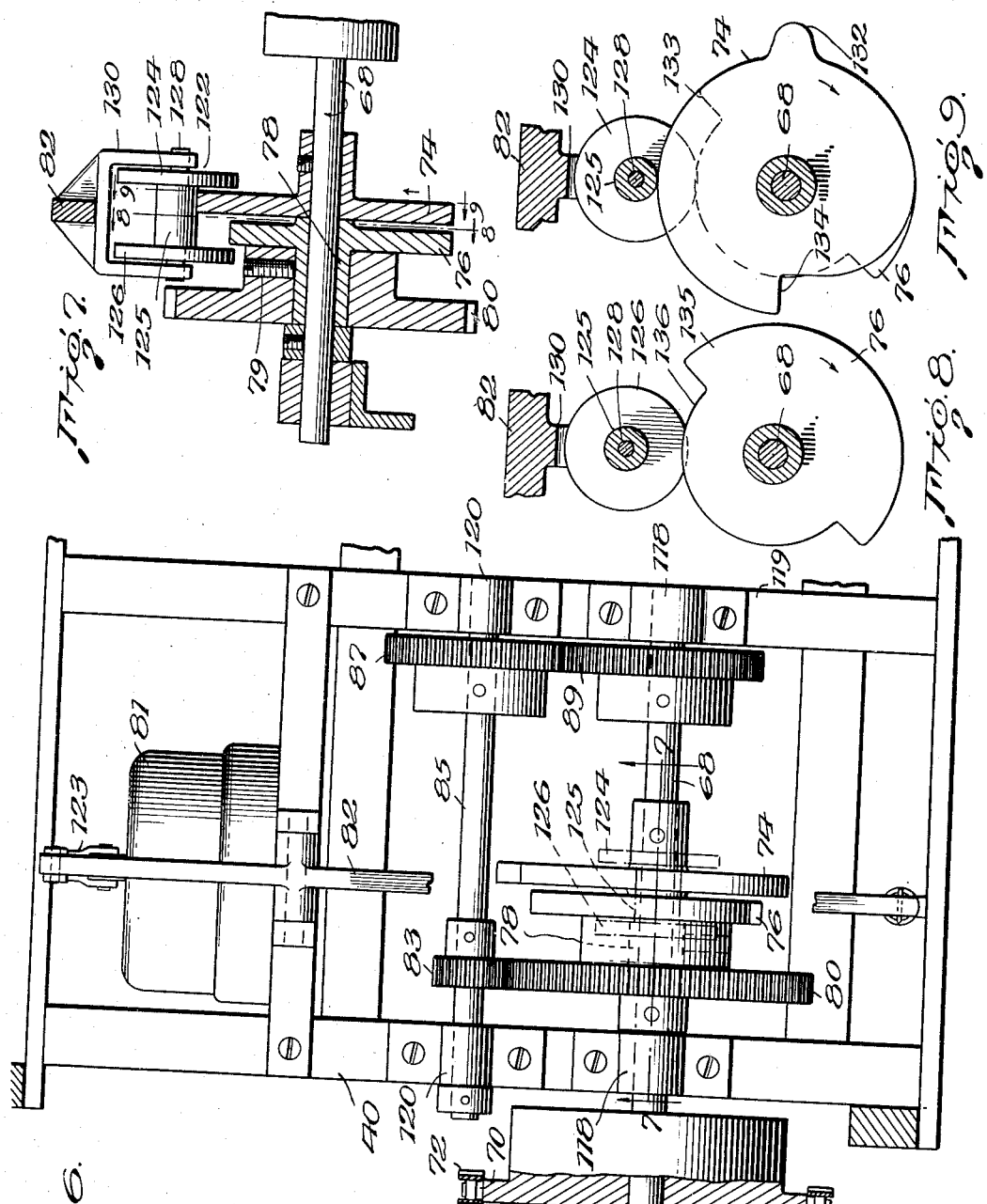

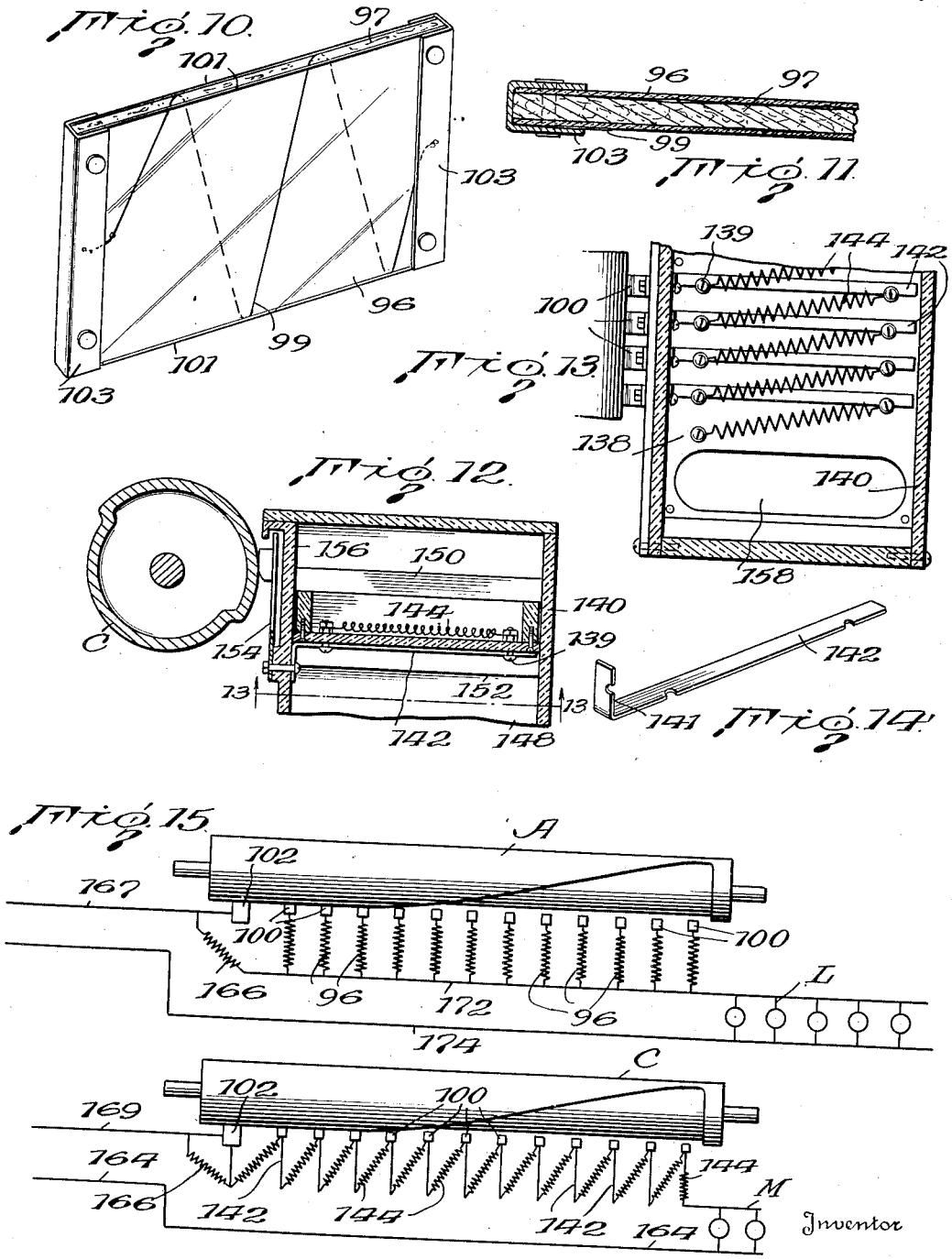

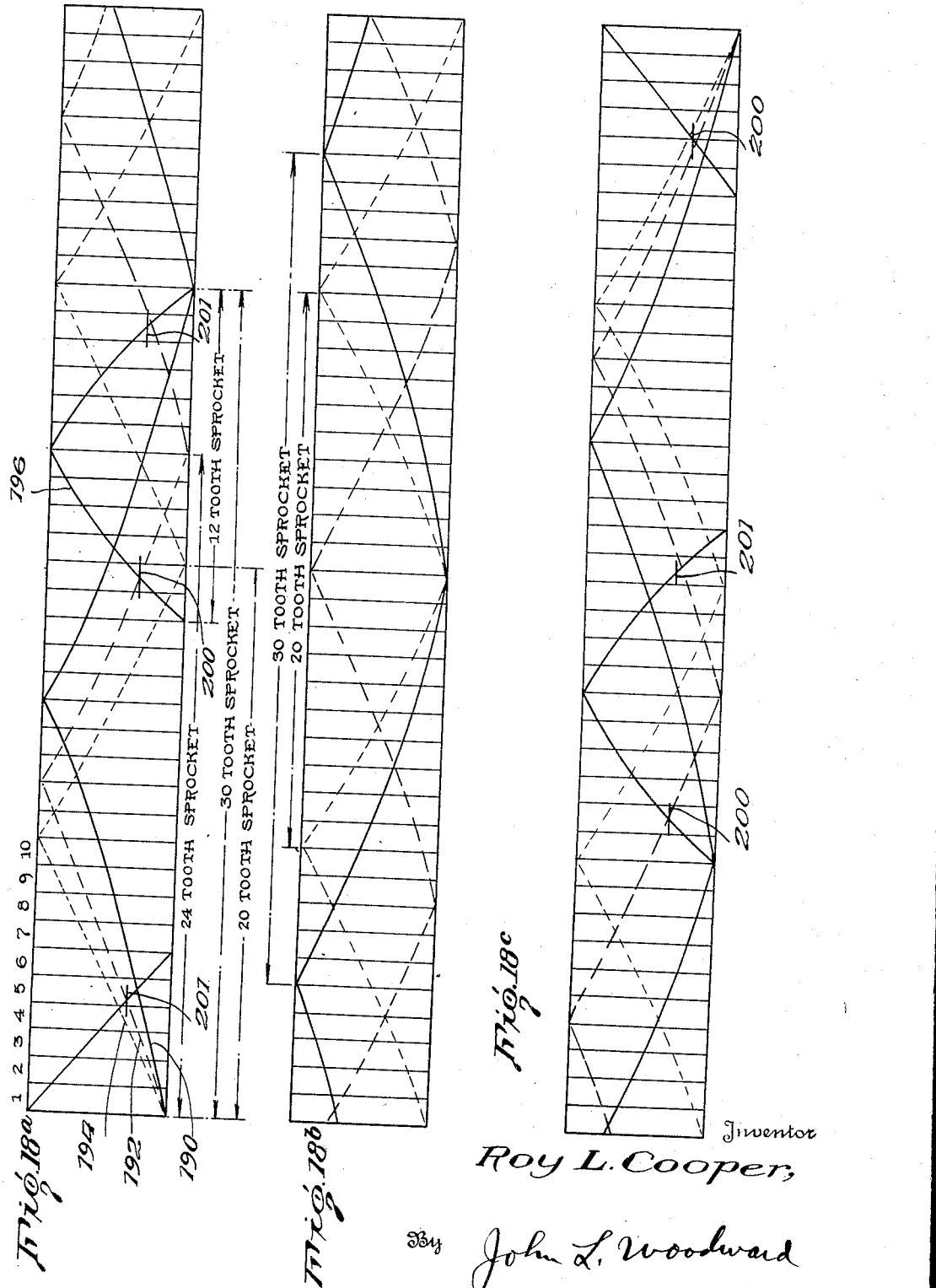

Patented Mar. 5, 1940

2,192,673

UNITED STATES PATENT OFFICE 2,192,673

ILLUMINATION CONTROL SYSTEM

Roy L. Cooper, Hammond, Ind., assignor to Colorflex Corporation, Hammond, Ind.

Application October 5, 1937, Serial No. 167,447

8 Claims. (Cl. 177—346)

This invention relates generally to current controlling systems and more particularly to systems for controlling current to color lights as applied to electric signs, flood lights, stage effects, window displays and the like.

My Patent 2,041,458, Illumination control system, sets up the control system for an electrical display and the present application is an improvement thereon.

The invention embodies a multiplicity of intensity control means of novel construction which are actuated at respectively different speeds whereby color lights are automatically blended.

An object of the invention is to provide an automatic mobile color-lighting system operating to give a predetermined sequence of color control with blending of colors.

My invention also includes the control of a plurality of banks of lights, preferably of different colors, together with control means wherein there is a progressive, automatic, and continuous blending of the component colors of light.

Another object of my invention is a novel and automatic means of actuating various resistance devices, whereby all possible color combinations are produced in continuous blending of the component colors and in which points of insufficient illuminations of the continuity are supplemented by the automatic interspersal of predetermined cycles of light from an auxiliary circuit.

Another object of the invention is to provide an apparatus which is adapted to carry a heavy current load, and also adapted to be easily changed to carry smaller current loads.

Another object of my invention is the provision of means in each of the intensity control means circuits for preventing flickers in the other circuits when the illumination in any one of the intensity control means circuits comes to maximum or to minimum points of intensity.

Still another object of the invention is the provision of novel intensity control means including revolving cylinders consisting of two portions, one being of greater radius than the other portion and of such construction, that the portion of the cylinders having the greater radius will come into contact consecutively with a straight line of stationary brushes and these brushes will go out of contact consecutively and uniformly in the reverse order of coming into contact with the portion of the cylinders having the greater radius.

Another object of the invention is the provision of a multiplicity of resistors for each intensity control means which are adapted to be inserted in suitable holders, and these resistors may be utilized either in parallel or in series.

Another object of my invention is the provision of novel switch control means for the supplemental circuit including a switch cam and a master cam spaced in operable relationship whereby the switch cam turns on and off the supplemental circuit while the master cam prevents the supplemental circuit from being either turned on or off except at the desired intervals of the cycle.

The novel features that I consider characteristic of my invention are set forth with particularity in the appended claims. The invention itself, however, both as to its organization and its method of operation together with additional objects and advantages thereof, will be best understood from the following description of the specific embodiment when read in connection with the accompanying drawings in which:

Figure 1 is a rear elevational view of the intensity control unit, disclosing the cylinders, the auxiliary switch means of the device, the motor for operating the intensity control means, and the fan which circulates air through the resistors to dissipate the heat.

Figure 2 is an end elevational view of the intensity control unit taken from the right side of Figure 1 disclosing a sprocket chain engaging the gear take off from the motor and the sprocket gears of the respective cylinders of the control means.

Figure 3 is a top plan view of the intensity control unit, disclosing the top cylinder, and the top set of resistance elements, in the parallel adaptation.

Figure 4 is a front view of a part of the intensity control unit disclosing the electrical board from which the light circuits are connected, and the conductor leading from the switch to each of the intensity control means and the conductor leading back to the switch panel.

Figure 5 is a vertical sectional view taken on line 5—5 of Figure 1.

Figure 6 is a view taken on line 6—6 of Figure 1 disclosing the gearing connections of the auxiliary switching means.

Figure 7 is a sectional view on line 7—7 of Figure 6 disclosing the operable relationship between the switch cam, the master cam and the end of the switch arm.

Figure 8 is a view taken on line 8—8 of Figure 7 disclosing the master cam in detail.

Figure 9 is a view taken on line 9—9 of Figure 7 disclosing the switch cam in detail.

Figure 10 is a perspective view of one of the resistance elements.

Figure 11 is a fragmentary view of one of the resistance elements, disclosing its construction.

Figure 12 is a fragmentary sectional view of a modification of the intensity unit disclosing one of the intensity control means, as adapted in series resistor utilization.

Figure 13 is a view taken on line 13—13 of Figure 12, disclosing the series connection of the resistance elements of the modification.

Figure 14 discloses a perspective view of one of the electrical connector bars employed in the series set up of the resistance elements.

Figure 15 is a diagrammatical view of a light circuit, disclosing its intensity control means connected in the circuit in parallel.

Figure 16 is a diagrammatical view of a light circuit disclosing its intensity control means connected in the circuit in series.

Figure 17 is a diagrammatical representation of a system of control for groups of lamps embodying my invention.

Figures 18a, 18b and 18c are diagrams showing a complete continuity of the fluctuations of the color circuits, and the interspersal of the fluctuations of the white or auxiliary light circuit when the composite fluctuations of the color circuits have fallen below predetermined current values.

Referring now in detail to Figure 1, 20, 22, 24 and 26 are hollow cylinders mounted in a frame 28. The cylinders 20, 22, 24, and 26 are mounted in the frame 28, one above the other in a compact manner so that the intensity control unit 30 will be of suitable size. Each of the cylinders have a metal shaft 32, which extends through the hollow center of the cylinder and the ends of the shaft 32 are mounted in bearings 36, 38 respectively and which bearings are secured to straps 40, 42 of the frame 28. The metal shafts 32 are at each end insulated from the cylinders 20, 22, 24 and 26 by fiber disks 34. On one end of the metal shafts 32 are secured sprocket gears 44, 46, 48, and 50. A sprocket gear 52 is mounted on the end of a counter shaft 54 of the electric motor 56. A sprocket chain 58 is connected to the sprocket gear 52 and is also geared to the cylinder sprockets 44, 46, 48, and 50. A blower 59 mounted on the motor shaft 60, operates to pull cool air through the inlet 62, and forces it out the outlet 64 into the intensity control unit to keep the unit cool. The unit is adapted to have a casing (not shown) to improve its appearance thereof. Shaft 32 of the cylinder 24 has a gear sprocket 66 mounted on one end. A shaft 68 has a sprocket gear 70 mounted on its outer end. The sprocket gear 66 has gear teeth ratio to the sprocket gear 70 of 1 to 2. The sprocket chain 72 is geared to these two gears. Shaft 68 has attached thereto a switch cam 74, and loosely mounted on this shaft is a master cam 76. Master cam 76 has a collar portion 78, and gear 80 is fastened to the collar 78 by a screw 79 or the like means. The end of a switch arm 82 is mounted over the top of the switch cam 74 and the master cam 76.

In Figure 2 idler sprocket 84 is employed to keep the sprocket chain 58 in contact with the sprocket gears 44, 46, 48, and 50 of the cylinders 20, 22, 24, and 26 respectively of the intensity control unit 30. Switch 86 secured to the rear of the unit 30 controls the current from a source (not shown) to the control unit 30. A set of resistance elements 88 secured to the frame 28 are adapted to be associated with each of the metal cylinders 20, 22, 24, and 26. Each of the metal cylinders have a lead-in conductor 90 connected to an electrical conductor 92 attached to the outside of the resistance casings 94. Conductor 92 is connected to the switch 86. The sprocket gear 48 of the cylinder 24 which cylinder comprises the element that makes and breaks contact with the stationary brushes 100 on the rear side of its resistance elements, revolves in the present adaptation ten times during one completed continuity of the light fluctuations of the electrical system. All of the metal cylinders are adapted to be in and out of contact with brushes 100 of the resistance elements during their respective rotations during a complete continuity. The sprocket gear 50 of the cylinder 26 rotates four times during one continuity of the light fluctuation; sprocket 46 of the metal cylinder 22, rotates six times during one continuity of the light fluctuation, and the sprocket gear 44 of the metal contact cylinder 20, rotates five times during one continuity of the light fluctuations. The sprocket 50 of the intensity control means 31 for light circuit R (Fig. 17), has 30 teeth; sprocket gear 48 of the intensity control means 29, or auxiliary control means, for light circuit W, has 12 teeth; sprocket gear 46 of the intensity control means 27 for light circuit B, has 20 teeth; and sprocket gear 44 of the intensity control means 25, for light circuit Y, has 24 teeth.

In Figure 3 which is a top plan view of the intensity control unit disclosing one of the casings 94 for holding the resistance elements 96 of the intensity control means. In the drawings only 6 resistance elements are shown, but in my present adaptation, I use 30 resistance elements for each of the four circuits employed although the number may be raised as desired. Each resistance element is held in each of the casings 94 by spring metal holders 98 at the front and rear thereof. Brushes 100 are secured to the insulated rear portions 95 of the casings 94. All of the resistance elements 96 have a brush 100 electrically connected thereto. The brushes are adapted to make contact and break contact with the novel cylinders which will be hereinafter described. Each of the intensity control means has a main brush 102 mounted on the rear plate 95 of the casing 94 and which is always in contact with its copper cylinder. The main brushes 102 are connected to metal rods 104, and the lead-in conductors 90 are connected to the metal rods 104 at the opposite ends.

In Figure 4 which discloses a front view of a portion of the intensity control unit 30. The metal plates 93 have spring holders 98 of the resistance elements 96 secured to the inside thereof. Conductor wires 106, 108, 110, and 112 lead from the front of the metal plates 93 to a panel board 114. The panel board is electrically connected to the respective light circuits. Conductor 116 leads from the panel board 114 back to the switch 86 which controls the source of power (not shown). Conductor 106 connects the plate 93 of the intensity control means 31 through the panel 114 with the conductor 180 leading to the bank of lights R (Fig. 17). Conductor 108 connects plate 93 of the intensity control means 29 through the panel board 114 with the conductor 182 leading to the bank of lights W, but here the circuit is not completed until the auxiliary switch 31 is closed by my novel switch means. Conductor 110 connects the plate 93 of the intensity control means 27 through the panel board 114 with the conductor 184 connecting with the bank of lights B. Conductor 112 connects plate 93 of the intensity control means 25 through the panel board 114 with the conductor 186 leading to the bank of lights Y. The bank of lights R, B, and Y are respectively red, blue and yellow, while the auxiliary bank of lights W are white lights. I here show the use of the primary colors for the main circuits and a white light to be added to the color combination at predetermined intervals, it is to be understood that I may use any other colors. Also the color combination for the circuits may be different, that is, I may substitute red for blue and blue lights for the red lights and the like.

In Figure 5, the metal cylinders 20, 22, 24, and 26 are shown in section and which discloses their novel construction. Each of the cylinders have a raised portion 23 and lowered portion 21. The raised and lowered portions are concentric to each other with the raised portion 23 having a greater radius than the lowered portion 21. At the end of the cylinders adjacent the main brushes 102, is a portion which has the same radius throughout its circumference as the raised portion 23. The lowered portion 21 begins just beyond the main brushes 102 so that the first brushes 100 of the resistance elements 96 can be out of contact with the cylinders 20, 22, 24, and 26 at certain predetermined intervals. The lowered portions 21 adjacent the first brushes 100 are only a very small part of the metal cylinders, but the lowered portions gradually increase, that is they become greater toward the other end of the cylinders, until at the last brush 100, the lower portions 21 are equal to substantially the whole of the circumference of the cylinders. So at the same time, the raised portions 23 of the cylinders beginning at the end adjacent of the main brushes 102, includes substantially the greater portion of the circumference of the cylinders and the raised portions gradually decrease in size until the raised portions at the opposite ends of the cylinders are approximately the size of the lowered portions adjacent the main brush end of the cylinders. The brushes 100 are adapted to contact the raised portions of the cylinders 23 when the raised portions are adjacent thereto, while the lower portions 21 of the cylinders 26, 20, 24, and 22 are adjacent to be out of contact with the brushes 100. The cylinders 26, 20, 22, and 24 rotate in the present adaptation 4, 5, 6 and 10 times respectively so that the raised portions 23 of the cylinders will contact the brushes 100 of the resistance elements 96 and as the cylinders rotate farther, the brushes 100 will gradually go out of contact as the area of the lowered portions 21 will increase adjacent the brushes. There will be times when all of the brushes 100 of each of the intensity control means will be out of contact with the cylinders. As the cylinders rotate at different speeds, the number of brushes 100 of the different circuits which are in and out of contact with the cylinder vary for each circuit at different times throughout the continuity. The cylinders 20, 22, and 26 constitute elements in the intensity control means which control electrical circuits to banks of lamps of primary or any other color combination desirable, while cylinder 24 is an element in the intensity control means of an auxiliary or supplemental circuit which controls current to a bank of lamps which may be white lamps or of any desired color. The auxiliary circuit is opened at all times except when cut in by a novel switching means to be described later. The auxiliary circuit is cut in at those times when the composite illumination of the other circuits falls below predetermined values. The intensity control means for the different circuits are designated 25, 27, 29, and 31 respectively.

In Figure 6, the novel switching means for the auxiliary intensity control means 29 is set out in detail. On the shaft 68 is securely mounted a switch cam 74 which rotates at half the speed of the auxiliary cylinder 24 because the gear ratio between their respective gear sprockets is 1 to 2. Shaft 68 is mounted in bearings 118, 118 which bearings are secured to an end strap 40 and an intermediate strap 119. The master cam 76 which is made integral with a gear 80 by means of a collar 78, is loosely mounted on shaft 68. Near the inner end of shaft 68 is mounted a gear 89 which engages a duplicate gear 87 on a counter shaft 85. Near the outer end of counter shaft 85 is a gear 83 in mesh with gear 80 mounted on shaft 68. The gear ratio of the gears 83 and 80 is 1 to 5; that is, gear 83 in the present adaptation has twelve teeth while gear 80 has sixty teeth. Of course any other number of teeth having the ratio 1 to 5 may be employed. Counter shaft 85 is mounted in bearings 120 on the end strap 40 and the intermediate strap 119 as stated above. Cylinder 24 of the intensity control means 29 revolves ten times in one continuity and due to the ratio between cylinder 24 and shaft 68, the switch cam revolves only five times in one continuity. Since the master cam 76 and its integral gear 80 are loosely mounted on the shaft 68, and the ratio between gears 83 and 80 is 1 to 5, then the master cam 76 will revolve only one time in a complete light fluctuation continuity.

In Figure 7 is shown the operable relationship between the switch cam 74, the master cam 76, and the end of the switch arm 82. Near one end of the switch arm 82 is a forked arm 130 integral therewith. The mounting of switch arm 82 is shown in Figure 5. Arm 82 near its rear end is fulcrumed to a post 121. A connecting bar 123 fastened to the rear end of switch arm 82 is connected to the auxiliary switch 81, and the connecting bar 123 is adapted to be adjusted so that the switch 81 is actuated properly at all times. A spring 127 is secured to the opposite end of 82 and connected to the frame 28 so that the switch arm will be held under tension. Cam follower 122, is carried by the shaft 128 mounted to the forked arm 130 so that the cam follower may rotate freely. The flanges 124 and 126 of the cam follower 122 are spaced apart by an integral collar member 125 so that they will be beyond the outer surfaces of the switch cam 74 and master cam 76 respectively. The collar member 125 of the cam follower 122 is adapted to be engaged by the switch cam 74 during its rotations. The switch cam 74 has nose portion 132, and a cut out section 134, and master cam 76 has a cut out section 136 of 180 degrees. The nose 132 of the switch cam 74 cuts off the switch 81 to the supplemental bank of lights when the collar 125 of the cam follower 122 is engaged thereby, and the circuit remains open on the portion 133 between the nose 132 and the beginning of the cut out portion 134. When the collar 125 of the cam follower 122 reaches the end of the portion 133 and falls into the cut out portion 134, the switch 81 is closed and the current flows to the auxiliary bank of lamps W. The circuit remains closed until the nose 132 is again reached. The master cam 76 has a portion 135 of 180 degrees, and which portion is of greater radius than portion 75

136. There are times during a continuity of the light fluctuations, when portion 135 of the master cam 76 is coincident with the cut out portion 134 of the switch cam 74, and at those times the collar 125 of cam follower 122 does not fall into the cut out portion 134. This is so because portion 135 of the master cam rides against the collar 125 of the cam follower 122. In fact, the white light circuit W which is controlled by the switch cam assembly and the switch 81, is turned on only three times in a complete continuity, and these three times fall within one half of the continuity. The rheostats 25, 27, 29 and 31 are set at the beginning of the continuity so that the master cam and the switch cam are in such relationship that when the control unit or machine is started to operate the collar 125 of the cam follower 122 rests in the center of the cut out portion 136 of the master cam 76. This brings in one half of a light wave 196 of the supplemental circuit W at the beginning of the continuity, and a complete wave 196 within the first quarter of a complete continuity; and as the last half of the cut out portion 136 is not reached until the last quarter of the continuity (due to its rotation), the white light wave 196 is not brought into the display again until the last quarter of the continuity. (See Figure 18.)

Figure 10 discloses one of the resistance elements 96. The plate comprises an insulating core 97 which has a resistance wire 99 wound about it and mica plates 101 are secured to the sides. To each end of the resistance elements 96 are metal holders 103. The ends of wire 99 are connected to holders 103.

In Figures 12 and 13, a modified resistance element is disclosed. The resistance elements for this modification are wired in series. There are in this modified adaptation 30 stages of resistance for each intensity control means. These thirty stages of resistance for each intensity control means are secured to mica plates 138 or of other appropriate material. Metal bars or strips 142 are secured to the bottom side of the mica plate 138 by bolt and screw means 139. One of the resistance wires 144 has one end secured by one of the bolt and screw means 139 to one of the bars 142, and the other end of the wire 144 secured by the bolt and screw means at the opposite end of the adjacent bar 142. The next wire 144 is secured to the upper end of the adjacent or second bar and strung across and secured to the lower end of the third bar 142, and likewise throughout the series of bars. The last bar 142 is secured to the conductor line leading to a bank of lights while the first wire at the opposite end of the series of the resistance steps is connected to the line leading to the main brush 102. In Figure 12 the front plate 140 is adapted to be removable and the frame plate 138 with the resistance elements thereon can be slipped into and out of the casing 140 as desired. There are guide members at each end of the casing 140 for each of the mica plates 138, as shown at 150 and 152, for holding the plates 138 in the casing 140. The bars 142 are secured by screw means 152 to bars 154 of the brushes 100. The brushes 100 have retainer members 156 which are adapted to prevent the brushes from being pulled out too far onto the metal cylinder C. Each of the mica plates 138 has an air passage 158 so that an air circulation can be maintained to cool the resistance elements.

Figure 15 discloses a light circuit in which the resistance elements are connected in parallel. In this adaptation the more resistance elements cut into the circuit, the more current load it will carry. As the number of resistance elements 96 are cut out, the resistance increases, and the light intensity decreases. When the resistance steps are connected in parallel, the circuit is adapted to carry current leads of 1000 volts per cylinder. If it is desired that the circuits carry 2000 watts load, the number of resistance steps may be halved or in other words, the diameter of the wires may be doubled to take care of the increased current. There is a bleeder resistor 166 adjacent the main brushes 102, where the last brush 100 goes out of contact with cylinder A. This bleeder prevents a sudden current drop in this circuit so that there will be no sparks to burn the cylinder A as about 25% of the current is still flowing. Also bleeder 166 prevents a sudden break in its circuit so that the current from this circuit will not flow into other circuits of the system and cause flickering or surging of their intensities. Line 167 indicates for this representation, the lead-in conductor from the current source to the main brush 102. The current goes into the cylinder A from the main brush 102, and through those resistance elements 96 which are in contact with the cylinder, thence to the conductor 172 of the bank of lights L. The conductor 174 completes the circuit.

Figure 16 discloses a light circuit in which the resistance elements are shown connected in series. The series resistance set-up is shown in detail in Figures 12 and 13. In the series set-up when all of the brushes 100 are in contact with the cylinder C, the light in the light circuit M is greatest, because when all brushes are in contact with the cylinder C, all of the resistance steps 144 have been cut out except the last resistance step. That is, the circuit is made through cylinder C instead of through all of the resistance stages. In such an arrangement small current loads are used, and is adaptable to small machines. The lead-in conductor is indicated by 169 which is connected to the main brush 102 of the cylinder C. The current is fed into the cylinder C, and out the last brush 100 which is contacting the cylinder C, and from this last brush to the conductor 168 of the bank of lights M. Conductor 164 indicates the conductor which completes the circuit. The last brush 100 is connected by a resistance wire 144 to the conductor 168, or otherwise when the last brush 100 were in contact with the cylinder, current would be fed into the light circuit M without resistance.

In Figure 17, lead-in conductor is indicated by 171 which is connected to conductor 92 and conductor 92 is connected to the conductors 90. The current goes from 90 to each of the intensity control means 25, 27, 29, and 31. Conductors 186, 184, 182, and 180 lead from the other side of the intensity control means 25, 27, 29, and 31 respectively to the light circuits Y, B, W, and R respectively. The switch 81 is interposed in the supplemental circuit between the intensity control means 29 and the bank of lights W. The motor which operates the intensity control means for the respective circuits, is connected in the circuit by conductors 171, 177, and 178. Conductor 178 connects light circuits R, W, B, and Y of the intensity control means 31, 29, 27, and 25 respectively to the conductor 177 which completes the circuit to the source of power (not shown).

Figure 18 is a diagram disclosing three waves 190, 192 and 194 which demonstrate fluctuation of the various circuits through a complete continuity of the color fluctuations or intensities, and the interspersal of wave 196 representing the white light circuit fluctuations when the composite intensities of the color circuits have fallen below predetermined current values. The waves 196 represent the three times that the auxiliary circuit W is added and at what times they are added to the display. The numeral 200 represents the point where the composite illumination of the different color circuits is at a predetermined minimum and switch cam 74 cuts in the white light illumination represented by wave 196 to the composite illumination of the different color circuits. Numeral 201 represents the points where the composite illumination of the different color circuits is of sufficient intensities and at such a time the switch cam and the master cam 76 are in the proper relationship to cut out the white light illumination from the composite illumination of the different color circuits. The horizontal divisions represent the teeth of the sprockets which turn the cylinders, thus representing the speed ratios. Wave 190 represent sprocket 50 which has thirty teeth and controls the intensity control means 31 which is in the light circuit R. Wave 192 represents sprocket 44 which has twenty four teeth and controls the intensity control means 25 which is in the light circuit Y. Wave 194 represents sprocket 46 which has twenty teeth and contols the intensity control means 27 and which is in the circuit B. The wave 196 represents sprocket 48 which has twelve teeth and controls the intensity control means 29, and which is in the light circuit W.

The operation of the device is as follows; when the current is allowed to flow, it is introduced from line 171 (Fig. 17) to the motor 56 which motor actuates the sprocket chain 58 through gear 52, and the sprocket chain 58 therefore actuates the sprocket gears 44, 46, 48, and 50 attached to the ends of the metal cylinders 20, 22, 24, and 26 respectively of the intensity control means 25, 27, 29 and 31 respectively. Before the lights are turned on the cylinders are set at an initial position. That is, cylinders 26, 22, and 20 are set with the raised portions 23 to the back of the machine or so that there is no contact by these cylinders with the brushes 100 of their respective resistance elements. At the same time cylinder 24, or the cylinder of the supplemental circuit W is set so that it is in full contact with all of its brushes 100 of its resistance elements then the machine is operated until cylinder 24 has turned 180 degrees, or until its brushes are out of contact. Then at this point the cut out portion 134 of the switching cam 74 is reached and the collar 125 of the cam follower 122 falls from the high section 133 into the cut out portion 134 of the switch cam 74 and as a result switch arm 82 cuts in the swich 81 of the auxiliary light circuit W. The cut out portion 136 of the master cam 76 will at this time be practically centered, and this point of the master cam is the middle one of the three times the auxiliary light circuit is operating. The three times which the auxiliary light is used falls within one half of the complete continuity. Of the three times, the middle one of the three is the dead center or starting point of the continuity. The three times that the supplemental lights W are on occur during the 180 degrees or cut out portion 136 of the master cam 76. The current flows from the conductor 171 through line 92 to the lines 90 to the main brushes 102 of the intensity control means 25, 27, 29 and 31 respectively. The current goes from brushes 102 to the cylinders 20, 22, 24, and 26 of the intensity control means 25, 27, 29 and 31 respectively and from the intensity control means through conductors 186, 184, 182, and 180 to the bank of lights Y, B, W, and R respectively. As cylinders 20, 22, 24, and 26 are rotating 5, 6, 10, and 4 times during one continuity, and due to the raised section 23 which is of greater area at the main brush end of the cylinders, gradually decreases in area to the other end of the cylinders, and at the same time the lowered section 21 gradually increases, the number of brushes 100 of the resistance elements 96 and or 144 in contact with the different cylinders continually vary in number throughout the continuity. As a result there is a gradual blending of the various color intensities of the color circuits R, B, and Y. The auxiliary circuit W is brought in to the display only three times during a complete continuity. The auxiliary cylinder 24 is revolving all the time, and the sprocket chain 72 engages a gear 66 on shaft 32 of the auxiliary intensity control means 29, and chain 72 also engages gear 70 on the auxiliary switch shaft 68. The ratio between the gears 66 and 70 is 1 to 2, so that shaft 68 carrying the switch cam 74 revolves only five times in a complete continuity. On counter shaft 85 is mounted a gear 83 meshing with gear 80 which is an integral part of master cam 76, and cam 76 is loosely mounted on shaft 68. The gear ratio of 83 to 80 is one to five, so that the master cam revolves only one time in a complete continuity. The switch cam 74 will turn on the auxiliary switch 81 connected by conductors 111 and 113 to the conductor 182 of the intensity control means 29 and light circuit W respectively. The auxiliary lights are brought into the display system at the times when the composite current values of the other circuits are below predetermined values, due to the cut-out portion 136 of 180 degrees of the master cam 76, and that switch cam 74 has its turn-off nose 132, 180 degrees from the turn-on portion 134, and also that switch cam operates five times while the master cam operates one time, and also that the auxiliary rheostat 29 operates twice as fast as the switch cam. The regular light circuits are designated R, B, and Y (Fig. 17).

Although in accordance with the provision of the patent statutes, the invention is described as embodied in concrete form, it is to be understood that the system shown in the drawings and described in the above specification is merely illustrative and that the invention is not limited thereto since alterations and modifications will readily suggest themselves to persons skilled in the art without departing from the true spirit of this invention or the scope of the annexed claims.

What I claim as new and desire to secure by Letters Patent of the United States is:

1. In a system for controlling a plurality of different color lights, and a supplemental white light, a plurality of separate circuits connected in parallel for said lights, intensity control means associated with each of said circuits for varying the intensities of illumination of the said lights, the intensity control means for each circuit mounted for simultaneous rotation and being positively driven from a single power means, one of the intensity control means adapted to be rotated at a higher predetermined ratio of speed than the second intensity control means, the second intensity control means adapted to be rotated at a higher predetermined ratio of speed than the third intensity control means, and the fourth of the said intensity control means adapted to rotate at a higher predetermined ratio of speed than any of the other intensity control means, the said fourth or white light intensity control means having a switch cam timing control means associated therewith, the switch cam rotating at a lower predetermined ratio of speed than the fourth or white light intensity control means, and comprising a switch cam and a master cam in operable relationship, the switch cam rotating at a fixed speed ratio to the master cam thereby adding the fourth or white light circuit to the system only when the composite current value of the color circuits is below a predetermined stage.

2. In a system for controlling a plurality of different color lights, and supplemental or white lights, a plurality of separate circuits for said lights, intensity control means associated with said circuits for varying the intensities of illumination of said lights, the said intensity control means mounted for simultaneous rotation and being positively driven from a single source of power, one of the intensity control means adapted to be rotated at a higher predetermined ratio of speed than the second intensity control means so that the light fluctuation of the first intensity control means circuit is of less duration than the light fluctuation of the second intensity control means circuit, the second intensity control means adapted to be rotated at a higher predetermined ratio of speed than the third intensity control means so that the light fluctuation of the second intensity control means circuit is of less duration than the light fluctuation of the third intensity control means circuit, and the fourth intensity control means adapted to be rotated at a higher predetermined ratio of speed than any of the other intensity control means so that the light fluctuation of the fourth intensity control means circuit is of less duration than the light fluctuation of the other circuits, the said fourth intensity control means having a switch cam timing control means associated therewith, and comprising a switch cam and a master cam in operable relationship, the switch cam rotating at a lower predetermined ratio of speed than the fourth or white light intensity control means, the switch cam rotating at a fixed speed ratio to the master cam, thereby adding the fourth or white light circuit to the system only when the composite current value of the color circuits is below a predetermined stage.

3. In a system for controlling a plurality of different color lights, and supplemental or white lights, a plurality of separate circuits for said lights, intensity control means associated with said circuits for varying the intensities of illumination of said lights, the said intensity control means mounted for simultaneous rotation and being positively driven from a single source of power, one of the intensity control means adapted to be rotated at a lower predetermined ratio of speed than the second intensity control means so that the light fluctuation of the first intensity control means circuit is of greater duration than the light fluctuation of the second intensity control means circuit, the second intensity control means adapted to be rotated at a lower predetermined ratio of speed than the third intensity control means so that the light fluctuation of the second intensity control means circuit is of greater duration than the light fluctuation of the third intensity control means circuit, and the fourth intensity control means adapted to be rotated at a higher predetermined ratio of speed than any of the other intensity control means so that the light fluctuation of the fourth intensity control means circuit is of less duration than the light fluctuation of the other circuits, the said fourth intensity control means having a switch cam timing control means associated therewith, and comprising a switch cam and a master cam in operable relationship, the switch cam rotating at a predetermined lower speed ratio than the fourth or white light intensity control means, the switch cam rotating at a higher predetermined ratio of speed than the master cam, thereby adding the fourth or white light circuit to the system only when the composite current value of the color circuits is below a predetermined stage.

4. In a system for controlling a plurality of different color lights, and supplemental or white lights, a plurality of separate circuits for said lights, intensity control means associated with said circuits for varying the intensities of illumination of said lights, the said intensity control means mounted for simultaneous rotation and being positively driven from a single source of power, one of the intensity control means adapted to be rotated at a lower predetermined ratio of speed than the second intensity control means so that the light fluctuation of the first intensity control means circuit is of greater duration than the light fluctuation of the second intensity control means circuit, the second intensity control means adapted to be rotated at a lower predetermined ratio of speed than the third intensity control means so that the light fluctuation of the second intensity control means circuit is of greater duration than the light fluctuation of the third intensity control means circuit, and the fourth intensity control means adapted to be rotated a higher predetermined ratio of speed than any of the other intensity control means so that the light fluctuation of the fourth intensity control means circuit is of less duration than the light fluctuation of the other circuits, the said fourth or white light control means circuit having a switch cam timing control means associated therewith, and comprising a switch cam and a master cam in operable relationship, the switch cam being geared to operate at a lower predetermined ratio of speed than the intensity control means for the white lights, the switch cam rotating a higher predetermined ratio of speed than the master cam, thereby adding the fourth or white light circuit to the system only when the composite current value of the color circuits is below a predetermined stage.

5. In a system for controlling a plurality of different color lights, and supplemental white lights, intensity control means associated with each of said circuits for varying the intensities of illumination of said lights, a common drive for the intensity control means having gear connections to each, a gear ratio of three and one third to four to five to two for the intensity control means for the color lights and for the white lights, so that there will be a blending of the separate color intensities, and of the white light intensity, the said intensity control means for the white lights having the gear ratio of two having a switch cam timing control means in the said white or supplemental light circuit, and comprising a switch cam and a master cam in operable relationship, the switch cam having a gear ratio of 2 to 1 for the intensity control means for the white light circuit the switch cam having a gear ratio of 1 to 5 for the master cam, thereby adding the supplemental or white light circuit to the system only when the composite current value of the color circuits is below a predetermined stage, and means for actuating the intensity control means.

6. In a system for controlling a plurality of different color lights, and supplemental white lights, intensity control means associated with each of said circuits for varying the intensities of illumination of said lights, a common drive for the intensity control means having gear connections to each, a gear ratio of three and one third to four to five to two for the intensity control means for the color lights and for the white lights, so that there will be a blending of the separate color intensities and of the white light intensity, the said intensity control means for the white lights having the gear ratio of two having a switch cam timing control means in the said white or supplemental light circuit, and comprising a switch cam and a master cam in operable relationship, the switch cam being geared to operate at only one half the speed of the intensity control means for the white lights, the switch cam and the master cam making only one complete revolution in each continuity operating five times as fast as the master cam thereby adding the supplemental or white light circuit to the system only when the composite current value of the color circuits is below a predetermined stage, and means for actuating the intensity control means.

7. In a system for controlling a plurality of different color lights, and a supplemental white light, a plurality of separate circuits connected in parallel for said lights, intensity control means associated with each of said circuits for varying the intensities of illumination of the said lights, the intensity control means for each circuit mounted for simultaneous rotation and being positively driven from a single source of power, one of the intensity control means adapted to be rotated at a higher predetermined ratio of speed than the second intensity control means, the second intensity control means adapted to be rotated at a higher predetermined ratio of speed than the third intensity control means, and the fourth of the said intensity control means adapted to rotate at a higher predetermined ratio of speed than any of the other intensity control means, the said fourth or white light intensity control means having a switch cam timing control means associated therewith, and comprising a switch cam and a master cam in operable relationship, the switch cam being geared to operate at a lower predetermined ratio of speed than the intensity control means for the white lights, the switch cam rotating at a higher predetermined speed ratio than the master cam thereby adding the fourth or white light circuit to the system only when the composite current value of the color circuits is below a predetermined stage.

8. In a system for controlling a plurality of different color lights, and supplemental white lights, intensity control means associated with each of said circuits for varying the intensities of illumination of said lights, a common drive for the intensity control means having gear connections to each, a gear ratio of three and one third to four to five to two for the intensity control means for the color lights and the white or supplemental lights, so that there will be a blending of the separate color intensities and of the white lights intensity, the said intensity control means for the white lights having the gear ratio of two and having a switch cam timing control means associated with the white light circuit, and comprising a switch cam and a master cam in operable relationship, the switch cam being geared to operate at only one half the speed of the intensity control means for the white lights, the switch cam operating five times as fast as the master cam thereby adding the supplemental or white lights to the system in only one half of the continuity and when the composite current value of the color circuits is below a predetermined stage, and means for actuating the intensity control means.

ROY L. COOPER.